(12) United States Patent
Müller et al.

(10) Patent No.: US 8,148,930 B2
(45) Date of Patent: Apr. 3, 2012

(54) CONTROL DEVICE FOR CONTROLLING A MACHINE TOOL WHICH CAN BE USED TO DRIVE TOOLS

(75) Inventors: Jürgen Müller, Ludwigsburg (DE); Albrecht Speck, Hohenstein/Ernstthal (DE); Tom Tolkmitt, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 388 days.

(21) Appl. No.: 12/467,523

(22) Filed: May 18, 2009

(65) Prior Publication Data

US 2009/0284209 A1    Nov. 19, 2009

(30) Foreign Application Priority Data

May 19, 2008    (EP) .................................... 08009206

(51) Int. Cl.
*G05B 9/02* (2006.01)
(52) U.S. Cl. ...................................................... 318/566
(58) Field of Classification Search ........... 318/565–567
See application file for complete search history.

(56) References Cited

U.S. PATENT DOCUMENTS

| 4,823,253 | A | * | 4/1989 | Shima et al. | 700/86 |
| 5,055,754 | A | * | 10/1991 | Kishi et al. | 318/565 |
| 5,383,110 | A | * | 1/1995 | Fujita et al. | 700/86 |
| 5,565,749 | A | * | 10/1996 | Jinno et al. | 318/566 |
| 5,568,028 | A | * | 10/1996 | Uchiyama et al. | 318/566 |
| 6,133,705 | A | * | 10/2000 | Inoue et al. | 318/632 |
| 6,795,738 | B1 | * | 9/2004 | Muller | 700/14 |
| 6,969,961 | B2 | * | 11/2005 | Tolkmitt et al. | 318/34 |
| 7,847,506 | B2 | * | 12/2010 | Ogawa | 318/574 |
| 2005/0033459 | A1 | | 2/2005 | Ide et al. | |

FOREIGN PATENT DOCUMENTS

| CH | EP-0399950 A1 * | 11/1990 |
| DE | 9318539 U1 | 2/1994 |
| DE | 19648347 C1 | 8/1997 |
| DE | EP-2175333 A1 * | 4/2010 |
| EP | 0399950 A1 | 11/1990 |
| JP | 59047140 A | 3/1984 |
| JP | 60177844 A | 9/1985 |

* cited by examiner

*Primary Examiner* — Thomas Dougherty
(74) *Attorney, Agent, or Firm* — Henry M. Feiereisen; Ursula B. Day

(57) ABSTRACT

A control device for controlling a machine tool which can be used to drive tools includes a memory for storing a movement limit value which is respectively assigned to the tools and is specific to the respective tool. A desired value generating unit generates desired values for controlling the movement of the tool. The desired values are limited by a limiting unit on the basis of the assigned movement limit value in such a manner that the movement limit value is not exceeded when moving the tool.

6 Claims, 1 Drawing Sheet

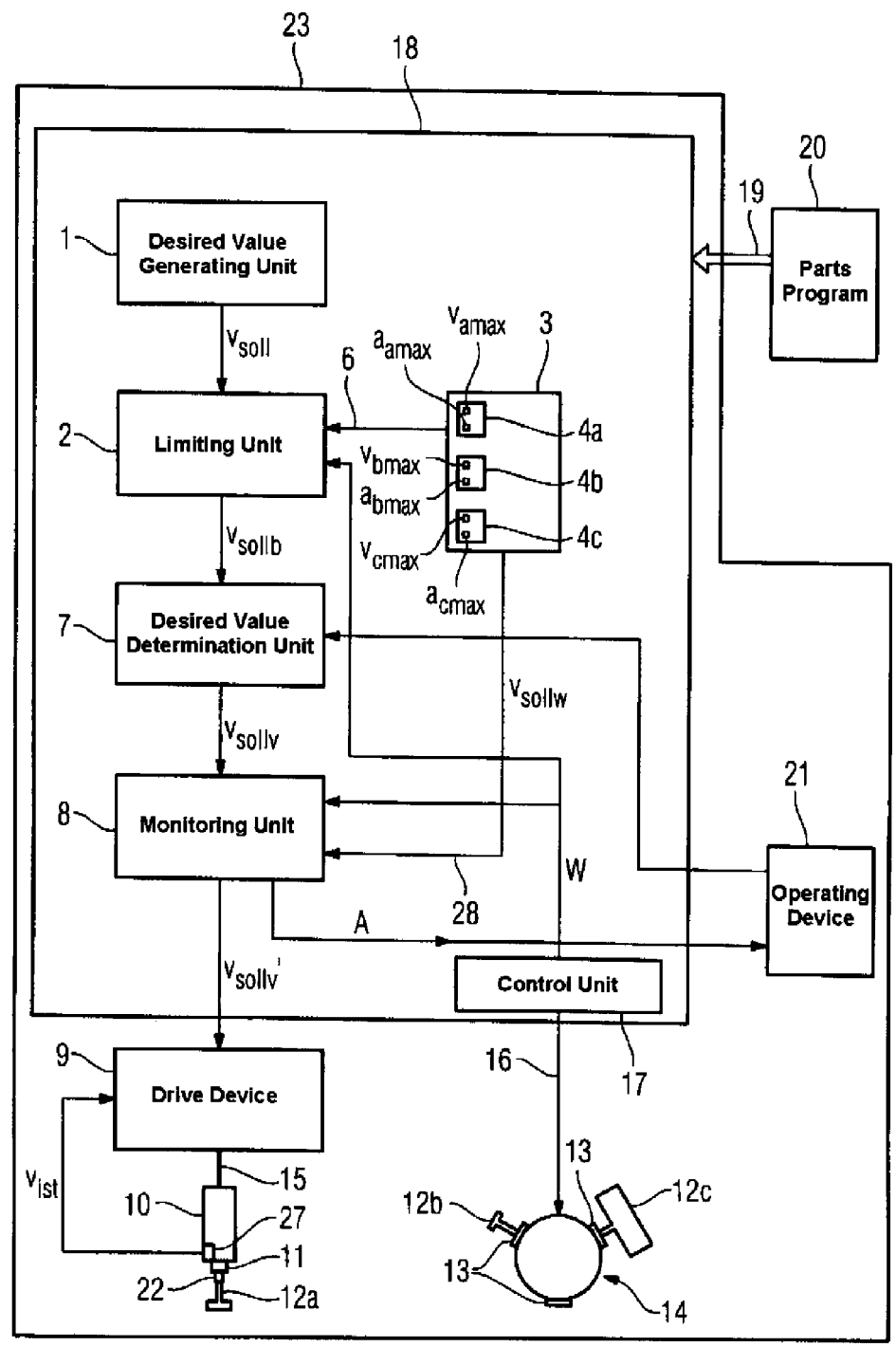

CONTROL DEVICE FOR CONTROLLING A MACHINE TOOL WHICH CAN BE USED TO DRIVE TOOLS

CROSS-REFERENCES TO RELATED APPLICATIONS

This application claims the priority of European Patent Application, Serial No. EP08009206, filed May 19, 2008, pursuant to 35 U.S.C. 119(a)-(d), the content of which is incorporated herein by reference in its entirety as if fully set forth herein.

BACKGROUND OF THE INVENTION

The present invention relates to a control device for controlling a machine tool which can be used to drive tools, and to a method for safely operating such a machine tool.

The following discussion of related art is provided to assist the reader in understanding the advantages of the invention, and is not to be construed as an admission that this related art is prior art to this invention.

Commercially available machine tools generally have a tool changer which is fitted with a plurality of tools and is used to automatically change the tool needed for the respective necessary machining operation for machining a workpiece. In this case, the tool changer is used to insert the tool currently needed for the machining operation, for example a particular milling cutter, into the tool receiving apparatus of a rotatably arranged spindle. The tool-changing operation and the subsequent machining operation are controlled by a control device of the machine tool. In this case, the control device uses a parts program to control the machining operation and which tool is used for the relevant machining operation. The parts program defines, for example, the speed, in particular the speed of rotation, at which the tool, for example a milling cutter, should rotate.

However, the individual tools often have large differences in mass and large differences in the geometrical structure. A correspondingly large tool, for example a large milling cutter, may generally rotate only at an essentially low speed of rotation in comparison with a small tool, for example a small milling cutter or small drill. If a speed of rotation (the speed of rotation may be in the form of a rotational speed, for example, in this case) which is too high for the tool has now been defined, for example in the parts program, on account of negligence, for example, this may result in severe damage to the tool, to the machine or even, in the extreme case, to people because destroyed parts of the tool, for example, may fly through the area at high speed and may hit people.

Even if the speed of rotation for the respective tool is correct in the parts program, severe damage to the tool, to the machine tool and to people around the machine tool may nevertheless result. In addition to the speed movement limits described above, the tool may often also be accelerated only with a particular maximum acceleration and maximum jerk. If, for example, a tool is accelerated to the accordingly predefined speed of rotation too quickly, it may become detached from the tool receiving apparatus, for example, which may result in the above-mentioned severe damage. This occurs again and again in practice since the control device generally generates the corresponding desired values for controlling the motor, which drives the tool, in such a manner that the desired speed of rotation is reached as quickly as possible, that is to say the tool is accelerated as quickly as possible on the basis of the maximum acceleration capacity of the motor. In the case of small low-mass tools, this procedure is generally optimal but it can result in the abovementioned damage in the case of larger, high-mass or more complex tools.

In commercially available machine tools, it is known practice to monitor the rotational speed of the tool by means of additional hardware which is external to the control system and has an additional measuring system.

It would be desirable and advantageous to address prior art shortcomings and to provide a control device and a method to enable a safe and reliable operation of a machine tool.

SUMMARY OF THE INVENTION

According to one aspect of the present invention, a control device for controlling operation of a machine tool to drive a tool includes a memory storing a movement limit value which is specific to a tool, a desired value generating unit generating a desired value for controlling a movement of the tool, and a limiting unit determining a limited desired value by limiting the movement limit value, such that the movement limit value is not exceeded when the tool moves.

According to another aspect of the present invention, a method for safely operating a machine tool which can be used to drive a tool includes the steps of assigning a movement limit value which is specific to a tool, storing the movement limit value; generating a desired value for controlling a movement of the tool, generating a limited desired value by limiting the desired value as a function of the movement limit value, and limiting the tool-specific movement limit value with the limited desired value to prevent the movement limit value from being exceeded when the tool moves.

According to another advantageous feature of the present invention, the control device may include a desired value determination unit for determining changed desired values from the limited desired values and further desired values, and a monitoring unit which monitors the changed desired values and/or comparison values derived from the desired values in order to determine whether they exceed the specific movement limit value assigned to the respectively driven tool or the specific movement limit values assigned to the respective driven tool and outputs an alarm signal if a movement limit value is exceeded.

Integrating an additional monitoring unit in the control device also makes it possible to monitor subsequently changed desired values.

According to another advantageous feature of the present invention, the control device can be designed in such a manner that, if the monitoring unit detects that the movement limit value has been exceeded, the control device controls braking of the movement of the respectively driven tool until the respectively driven tool comes to a standstill in such a manner that the movement limit value(s) is/are not exceeded during the braking operation for the respectively driven tool. This measure also makes it possible to safely operate the machine tool during a braking operation and thus reliably prevents damage to a tool, the machine tool or people on account of the braking operation.

According to another advantageous feature of the present invention, the desired values can be in the form of desired position values, desired speed values, desired acceleration values or desired jerk values. The embodiments of the desired values as desired position values, desired speed values, desired acceleration values or desired jerk values are conventional embodiments of the desired values.

According to another advantageous feature of the present invention, the movement limit value can be in the form of a speed movement limit value, an acceleration movement limit value or a jerk movement limit value or the movement limit values are in the form of speed movement limit values, acceleration movement limit values and/or jerk movement limit values. The embodiment of the movement limit value as a speed movement limit value, an acceleration movement limit value or a jerk movement limit value or the embodiment of the movement limit values as speed movement limit values, acceleration movement limit values and/or jerk movement limit values are conventional embodiments of the limit value(s).

According to yet another aspect of the present invention, a control device which includes a memory storing a movement limit value which is specific to a tool, a desired value generating unit generating a desired value for controlling a movement of the tool, and a limiting unit determining a limited desired value by limiting the movement limit value, such that the movement limit value is not exceeded when the tool moves.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE is diagrammatic illustration in the form of a block diagram of the subject matter of the present invention.

DETAILED DESCRIPTION OF PREFERRED EMBODIMENTS

The depicted embodiment is to be understood as illustrative of the invention and not as limiting in any way. In certain instances, details which are not necessary for an understanding of the present invention or which render other details difficult to perceive may have been omitted.

Turning now to the FIGURE, there is shown a machine tool 23 in the form of a diagrammatic illustration in the form of a block diagram. The machine tool 23 has a control device 18 for controlling the machine tool, a tool changer 14 and an operating device 21. In the configuration currently illustrated in the FIGURE, the tool changer 14 is fitted with the tools 12b and 12c (for example with different milling cutters). The tools are held in the tool changer 14 using holding apparatuses 13. On the output side, the control device 18 generates an output desired value signal in the form of output desired values $v_{sollv'}$ which are generated in an equidistant timing clock cycle and are in the form of output desired speed values within the scope of the exemplary embodiment. The output desired values $v_{sollv'}$ are output to a drive device 9 and form the desired control values for controlling the movement of the tool 12a. The drive device 9 internally has a controller and a converter for controlling a motor which is in the form of a spindle motor 10 within the scope of the exemplary embodiment. The drive device 9 controls the movement of a tool 12a, that is to say the speed of rotation of the tool 12a within the scope of the exemplary embodiment, according to the predefined output desired values $v_{sollv'}$. For this purpose, the drive device 9 is connected to the spindle motor 10 by means of a connection 15. The spindle motor 10 rotates a spindle 11 which has a tool receiving apparatus 22. Within the scope of the exemplary embodiment, the tool 12a which may be in the form of a milling cutter, for example, is currently situated in the tool receiving apparatus 22. The tool receiving apparatus 22 is used to clamp the tool 12a. The speed of rotation $v_{ist}$ of the rotating spindle 11 and thus that of the tool 12a are measured using a sensor 27 and are output to the drive device 9 as an actual controlled variable for the purpose of control.

The control device 18 also has a control unit 17 which is in the form of a so-called PLC (Programmable Logic Control) within the scope of the exemplary embodiment. This control unit 17 generates control signals 16 for controlling the tool changer 14. The tool changer 14 can be used to exchange the tool currently clamped in the tool receiving apparatus 22 according to the control signals 16.

In order to linearly move the spindle 11 and thus the tool 12a, the machine has a plurality of drive devices and motors which are accordingly assigned to the drive devices and, in a manner corresponding to the drive device 9, receive respectively assigned output desired values, as an input variable, from the control device 18 for the purpose of controlling the linear movement of the spindle 11. For the sake of clarity and since they are irrelevant for understanding the invention, the drive devices and motors provided for the purpose of linearly moving the spindle 11 are not illustrated in the FIGURE.

The control device 18 also has a desired value generating unit 1 for generating desired values for controlling the movement of the tool 12a using a parts program 20 which is read in by the control device 18, which is illustrated by an arrow 19. In this case, the parts program 20 defines each machining operation in the form of a sequence of instructions. In this case, the desired values $v_{soll}$ are generally determined in such a manner that the respective machining operation is carried out as quickly as possible. The desired values which are in the form of desired speed values $v_{soll}$ within the scope of the exemplary embodiment are output in this case in a fixed timing clock cycle. The desired value generating unit 1 thus outputs a desired value signal which is in the form of a sequence of desired speed values $v_{soll}$ which are output with equidistant timing.

According to the invention, the control unit 18 has a memory 3 which stores movement limit values $v_{amax}$, $a_{amax}$, $v_{bmax}$, $a_{bmax}$, $v_{cmax}$ and $a_{cmax}$ which are specific to the tools 12a, 12b and 12c. In this case, the movement limit values are in the form of speed movement limit values and acceleration movement limit values within the scope of the exemplary embodiment. The tool 12a may be rotated, at most, with the speed movement limit value $v_{amax}$ and may be accelerated, at most, with the acceleration movement limit value $a_{amax}$. In a corresponding manner, the tool 12b may be rotated, at most, with the speed movement limit value $v_{bmax}$ and may be accelerated, at most, with the acceleration movement limit value $a_{bmax}$. The tool 12c may be moved, at most, with the speed movement limit value $v_{cmax}$ and may be accelerated with the acceleration movement limit value $a_{cmax}$. Two movement limit values are thus defined for each tool within the scope of the exemplary embodiment. However, only one individual limit value may also be generally defined for each tool or else yet further limit values, for example a maximum jerk movement limit value, may be defined. This depends on the application and on the tools used. Movement limit values which are specific to the respective tool are thus stored in the memory 3 for each tool. In this case, the individual movement limit values are part of a data record 4a, 4b and 4c assigned to each tool.

According to the invention, the control device 18 has a limiting unit 2 for determining limited desired values $v_{sollb}$ using the assigned movement limit values which are specific to the respectively driven tool. In this case, the limiting unit 2 limits the desired values $v_{soll}$ in such a manner that the limited desired values $v_{sollb}$ generated by it and/or movement values derived from the limited desired values $v_{sollb}$ (for example desired values which are derived with respect to time and may be in the form of acceleration and/or jerk, for example) do not exceed the permissible specific movement limit value or the permissible specific movement limit values. The limiting unit 2 thus generates limited desired values $v_{sollb}$ which are adapted according to the movement limit values and do not exceed the permissible movement limit values for the tool 12*a* which is currently clamped in the tool receiving apparatus 22. For this purpose, the control unit 17 uses a signal W to inform the limiting unit 2 of the tool currently clamped in the tool receiving apparatus 22. According to the currently clamped tool, that is to say the tool 12*a* in the exemplary embodiment, the limiting unit 2 reads the movement limit values $v_{amax}$ and $a_{amax}$ associated with the tool 12*a* from the memory 3, which is illustrated by an arrow 6 in the FIGURE. The limiting unit 2 then calculates temporally derived desired acceleration values by deriving the desired speed values $v_{soll}$ over time (calculating the differential quotient with respect to time).

The desired speed values $v_{soll}$ are then compared with the speed movement limit value $v_{amax}$ and the desired acceleration values $a_{soll}$ are then compared with the acceleration movement limit value $a_{amax}$. If none of the movement limit values is exceeded, the desired values $v_{soll}$ are output to a desired value determination unit 7 in unchanged form. In this case, the limited desired values $v_{sollb}$ correspond to the desired values $v_{soll}$. If, however, the speed movement limit value $v_{amax}$ or the acceleration movement limit value $a_{amax}$ is exceeded, the limiting unit 2 determines limited desired values $v_{sollb}$ which are limited, in comparison with the desired values $v_{soll}$, in such a manner that the limited desired values and desired acceleration values temporally derived from the limited desired values $v_{sollb}$ do not exceed the respectively associated movement limit values $v_{amax}$ and $a_{amax}$. If, for example, the desired values $v_{soll}$ exceed the speed movement limit value $v_{amax}$, only limited desired values $v_{soll}$ which do not exceed the speed movement limited value $v_{amax}$ are output by the limiting unit 2. If, for example, the desired acceleration values exceed the maximum acceleration movement limit value $a_{amax}$, the limiting unit 2 determines limited desired values $v_{sollb}$ whose temporally derived acceleration values do not exceed the acceleration movement limit value $a_{amax}$.

The limited desired values $v_{sollb}$ determined in this manner could now be directly output to the drive device 9 in the form of output desired values, for example. Generally, however, the user also wishes to change the desired values in a user-specific manner again before they are output to the drive device 9. For this purpose, within the scope of the exemplary embodiment, the control device 18 has the desired value determination unit 7 which reads in the limited desired values $v_{sollb}$ on the input side. The user can generate further desired values $v_{sollw}$, for example by means of a handwheel, using an operating device 21 of the machine tool in order to change the speed of rotation of the spindle 11 and thus of the tool 12*a*, for example manually. However, further desired values may also be generated, for example, by a user unit (no longer illustrated in the FIGURE) in which the user can generate further desired values using specific programs. The desired value determination unit 7 uses the limited desired values $v_{sollb}$ and the further desired values $v_{sollw}$ to determine changed desired values $v_{sollv}$. According to the invention, the changed desired values $v_{sollv}$ are supplied to a monitoring unit 8 as an input variable. Within the scope of the exemplary embodiment, the changed desired values $v_{sollv}$ are in the form of changed desired speed values $v_{sollv}$.

The monitoring unit 8 first of all calculates changed desired acceleration values from the changed desired values $v_{sollv}$ by calculating the time derivative of the changed desired values $v_{sollv}$. The control unit 17 uses the signal W to inform the monitoring unit 8 of the tool currently clamped in the tool receiving apparatus 22. As already stated, this is the tool 12*a* within the scope of the exemplary embodiment. The monitoring unit 8 has access to the memory 3 and, for the respective tool currently clamped in the tool receiving apparatus 22, reads the specific movement limit values associated with the tool from the memory 3, which is illustrated by an arrow 28.

The monitoring unit 8 then monitors the changed desired values $v_{sollv}$ and comparison values, which are derived from the changed desired values (for example derivation with respect to time) and are in the form of derived changed desired acceleration values $a_{sollv}$ within the scope of the exemplary embodiment, in order to determine whether they exceed the specific movement limit values assigned to the respective tool which is currently being driven, that is to say the tool which is currently clamped in the tool receiving apparatus 22. If one of the movement limit values is exceeded, the monitoring unit 8 outputs an alarm signal A to the operating device 21. A corresponding alarm is then signaled to the user on the operating device 21.

If none of the movement limit values is exceeded, the monitoring unit 8 outputs the changed desired values $v_{sollv}$ as output desired values $v_{sollv'}$ in unchanged form. If, however, it is detected that a movement limit value has been exceeded, in addition to generating an alarm signal, the movement of the tool which is currently being driven, that is to say the tool 12*a* in the exemplary embodiment, is braked until the driven tool 12*a* comes to a standstill. In this case, the output desired values $v_{sollv'}$ are generated by the monitoring unit 8 in such a manner that the movement limit values for the tool 12*a* which is currently being driven are not exceeded when braking the movement of the driven tool 12*a*, that is to say the tool which is currently clamped in the tool receiving apparatus 22. This functionality is carried out by the monitoring unit 8 within the scope of the exemplary embodiment.

However, this need not necessarily be the case. It is also possible, for example, for the monitoring unit 8 to monitor only in order to determine whether the movement limit values have been exceeded and to additionally send the alarm signal A to the desired value determination unit 7, for example, if a movement limit value has been exceeded, and for said desired value determination unit to then generate correspondingly changed desired values $v_{sollv}$ for braking the movement of the tool 12*a* until the latter comes to a standstill, or for the alarm signal A to brake the tool and/or switch off the machine tool, in addition to being used for notification, without taking into account the movement limit values of the tool.

In particular, when the limit values are taken into account according to the invention, the braking operation is controlled in such a manner that the absolute values of the negative acceleration values, which occur during braking, do not exceed the corresponding acceleration limit value. In exceptional situations, for example when the emergency off button of the operating device 21 is pressed, the control device 18 can thus likewise control the braking operation in such a manner that the movement limit values of the tool which is currently being driven are not exceeded.

It is noted at this point that the desired value generating unit, the limiting unit, the desired value determination unit and/or the monitoring unit is/are generally in the form of software which is executed by an individual processor or a plurality of processors.

It is also noted at this point that the desired values are in the form of desired speed values within the scope of the exemplary embodiment. However, the desired values may also be in the form of desired position values, desired acceleration values or desired jerk values.

It is also noted at this point that the machine tool need not necessarily have a tool changer for the invention but rather the tools can also be changed manually, for example by an operator of the machine tool. It must only be ensured that the control device knows which tool is currently clamped in the workpiece holder and is thus being driven.

A measuring probe or a camera is often clamped in the workpiece receiving apparatus in order to measure a workpiece, for example. It is noted at this point that a measuring probe and a camera, inter alia, are also considered to be tools within the scope of the invention.

Furthermore, it is noted that the movement of the workpiece need not necessarily be in the form of a rotational movement as in the exemplary embodiment but rather may also be in the form of a linear movement or a combination of a linear movement and a rotational movement.

It is also noted at this point that it is alternatively also possible for the signal W to be transmitted from the control unit 17 to the memory 3 rather than from the control unit 17 to the limiting unit 2 as described above. The movement limit values associated with the tool 12a are then selected in the memory 3 using the signal W and are transmitted to the limiting unit 2 (see arrow 6).

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A control device for controlling operation of a machine tool to drive a tool, said control device comprising:
   a memory storing a movement limit value which is specific to a tool;
   a desired value generating unit generating a desired value for controlling a movement of the tool;
   a limiting unit determining a limited desired value by limiting the movement limit value, such that the movement limit value is not exceeded when the tool moves;
   a desired value determination unit determining a change in the desired value from the limited desired value and an additional desired value, and
   a monitoring unit which monitors at least one parameter selected from the group consisting of the changed desired value and a comparison value derived from the desired value, and determines whether the parameter exceeds the movement limit value and which triggers an alarm signal when the movement limit value is exceeded.

2. The control device of claim 1, constructed to control a braking operation of the tool until the tool comes to a standstill, when the monitoring unit detects that the movement limit value has been exceeded so that the movement limit value for the driven tool is prevented from being exceeded during the braking operation.

3. The control device of claim 1, wherein the desired value is selected from the group consisting of desired position value, desired speed value, desired acceleration value, and desired jerk value.

4. The control device of claim 1, wherein the movement limit value is selected from the group consisting of speed movement limit value, acceleration movement limit value, and jerk movement limit value.

5. A machine tool, comprising a control device which includes
   a memory storing a movement limit value which is specific to a tool,
   a desired value generating unit generating a desired value for controlling a movement of the tool,
   a limiting unit determining a limited desired value by limiting the movement limit value, such that the movement limit value is not exceeded when the tool moves,
   a desired value determination unit determining a change in the desired value from the limited desired value and an additional desired value, and
   a monitoring unit which monitors at least one parameter selected from the group consisting of the changed desired value and a comparison value derived from the desired value, and determines whether the parameter exceeds the movement limit value and which triggers an alarm signal when the movement limit value is exceeded.

6. A method for safely operating a machine tool which can be used to drive a tool, comprising the steps of:
   assigning a movement limit value which is specific to a tool;
   storing the movement limit value;
   generating a desired value for controlling a movement of the tool;
   generating a limited desired value by limiting the desired value as a function of the movement limit value;
   limiting the tool-specific movement limit value with the limited desired value to prevent the movement limit value from being exceeded when the tool moves;
   determining a change in the desired value from the limited desired value and an additional desired value;
   monitoring at least one parameter selected from the group consisting of the changed desired value and a comparison value derived from the desired value;
   determining whether the parameter exceeds the movement limit value; and
   triggering an alarm signal when the movement limit value is exceeded.

* * * * *